United States Patent
Chang

(10) Patent No.: US 7,281,257 B2
(45) Date of Patent: Oct. 9, 2007

(54) COOLING DEVICE USED IN AN OPTICAL RECORDING AND/OR REPRODUCING APPARATUS

(75) Inventor: Lung-Kuo Chang, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 344 days.

(21) Appl. No.: 11/085,189

(22) Filed: Mar. 22, 2005

(65) Prior Publication Data
US 2005/0216926 A1    Sep. 29, 2005

(30) Foreign Application Priority Data
Mar. 23, 2004  (TW) ............... 93107826 A

(51) Int. Cl.
G11B 33/14    (2006.01)
(52) U.S. Cl. .................................... 720/649
(58) Field of Classification Search ............... 720/649
See application file for complete search history.

(56) References Cited

U.S. PATENT DOCUMENTS 5,793,740 A * 8/1998 Nguyen ................... 369/264
6,549,368 B1 * 4/2003 Jeffers ..................... 360/99.08
6,657,945 B2 * 12/2003 Nguyen ................... 369/264
6,699,013 B2 * 3/2004 Zweighaft et al. ........... 416/1
2005/0216926 A1 * 9/2005 Chang ..................... 720/649

FOREIGN PATENT DOCUMENTS

| JP | 01171144 A | * | 7/1989 |
| JP | 03127395 A | * | 5/1991 |
| JP | 04061686 A | * | 2/1992 |
| JP | 08279242 A | * | 10/1996 |
| JP | 10275458 A | * | 10/1998 |

* cited by examiner

Primary Examiner—Angel Castro
Assistant Examiner—Christopher R. Magee
(74) Attorney, Agent, or Firm—Ming Chow; Sinorica, LLC

(57) ABSTRACT

A cooling device is used in an optical recording and/or reproducing apparatus. The optical recording and/or reproducing apparatus is used for writing and/or reading data from the surface of an optical media. The cooling device comprises a grapple and a blower. The grapple is used for holding the optical media. The blower agitates airflow when the grapple rotated. Whereby, the cooling device can decrease the temperature of the air within the optical recording and/or reproducing apparatus.

14 Claims, 4 Drawing Sheets

COOLING DEVICE USED IN AN OPTICAL RECORDING AND/OR REPRODUCING APPARATUS

BACKGROUND OF THE INVENTION (1) Field of the Invention

The invention relates to an optical recording and/or reproducing apparatus, and more particularly to a cooling device used in an optical recording and/or reproducing apparatus.

(2) Description of the Prior Art

FIG. 1 shows a schematic diagram depicting a traditional optical recording and/or reproducing apparatus 2, such as a VCD player or a DVD player. The optical recording and/or reproducing apparatus 2 includes a pickup head 4, a PCB (printed circuit board) 6, a grapple 34 and so on.

The pickup head 4 is used to extract the data stored on the surface of an optical storage medium, not shown, placed in the optical recording and/or reproducing apparatus 2. Optical discs are the well-known optical storage media. The data extracted from the optical storage medium is computed and processed by the chip 10 on the PCB 6 for playback. Then, the data is presented in the form of video and audio.

FIG. 2 shows a schematic view depicting the traditional grapple 34 including a clamper 3402 and a spindle motor 3404. A disc 5 is sandwiched between the clamper 3402 and the spindle motor 3404. Further, the spindle motor 3404 rotates the clamper 3402 and the disc 5 so as to allow the pickup head 4 to extract the data on the different locations of the disc 5.

However, in the optical recording and/or reproducing apparatus 2, the chip 10 on the PCB 6 and the pickup head 4 generate high temperature heat which leads to poor reading result or even failure of other elements.

Accordingly, it is one object of the present invention to provide a cooling device used in an optical recording and/or reproducing apparatus to solve the above problem.

SUMMARY OF THE INVENTION

Accordingly, it is one object of the present invention to provide A cooling device used in an optical recording and/or reproducing apparatus, thereby reducing the heat generated by the pickup head and the chip.

A cooling device used in an optical recording and/or reproducing apparatus which reads the data stored on an optical storage medium includes a blower and a grapple having a clamper and a spindle motor.

The grapple is used to hold the optical storage medium. The optical storage medium is sandwiched by the spindle motor and the clamper. The spindle motor rotates the clamper and the optical storage medium.

The blower can be on the clamper or the spindle motor of the grapple. The blades of the grapple extend from the grapple radially. The grapple rotate the blower and blades creating airflow.

Further, a baffle, fixed in the optical recording and/or reproducing apparatus, is used to guide the airflow to blow a heat source, such as the chip or the pickup head generating heat. Alternatively, the thermal conductive element, such as an metallic thermal conductive object or a thermal pipe, can be used to conduct the heat generated by the heat source to the blades and drained by the airflow.

The present cooling device makes use of the grapple and the blower thereon to create airflow when the grapple is rotated. In this way, the heat generated by the pickup head and the chip can be significantly reduced. This prevent of the optical recording and/or reproducing apparatus using the cooling device from overheat. Further, the possibility that reading error or failure of other elements occurs is reduced.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 3:
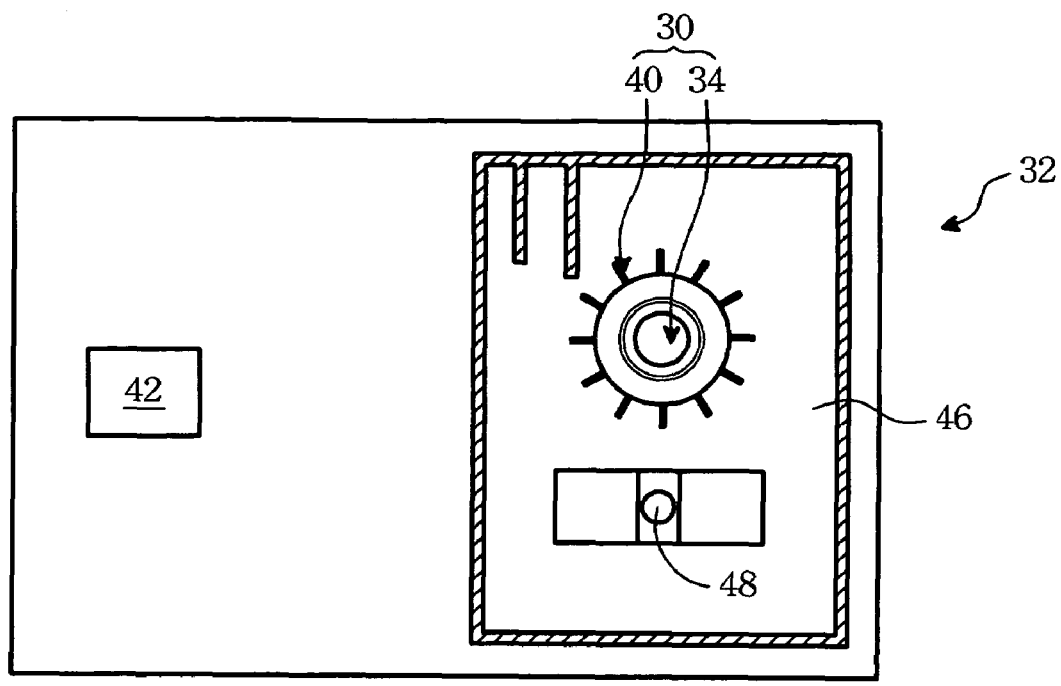
FIG. 3 shows a schematic view depicting the present cooling device and optical recording and/or reproducing apparatus.

FIG. 3 shows a schematic view depicting the present cooling device 30 and the present optical recording and/or reproducing apparatus 32, such as a VCD player or a DVD player, which reads or store the data from or into the surface of an optical storage medium. As shown in FIG. 3, the optical recording and/or reproducing apparatus 32 further includes a heat source, such as a chip 42, a pickup head 48, which generate heat during operation. The cooling device 30 includes the grapple 34 and a blower 40.

Figure 1:
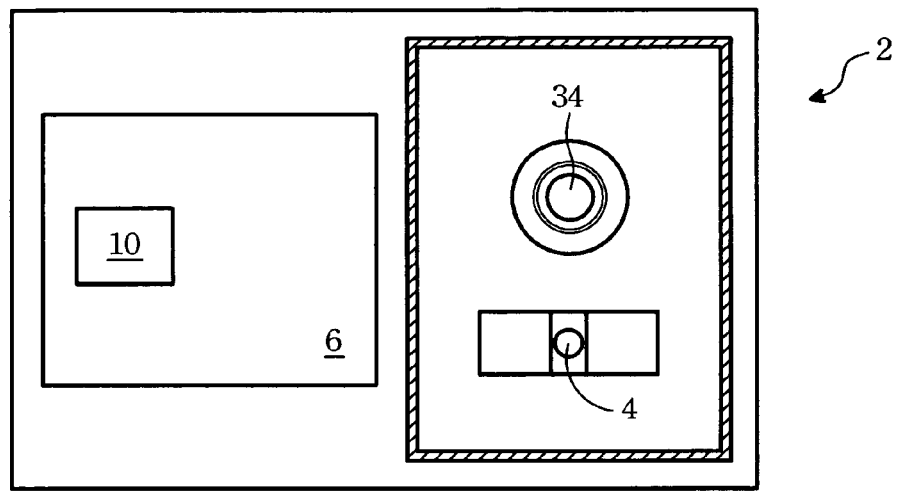
FIG. 1 shows a schematic diagram depicting a traditional optical recording and/or reproducing apparatus.
Figure 2:
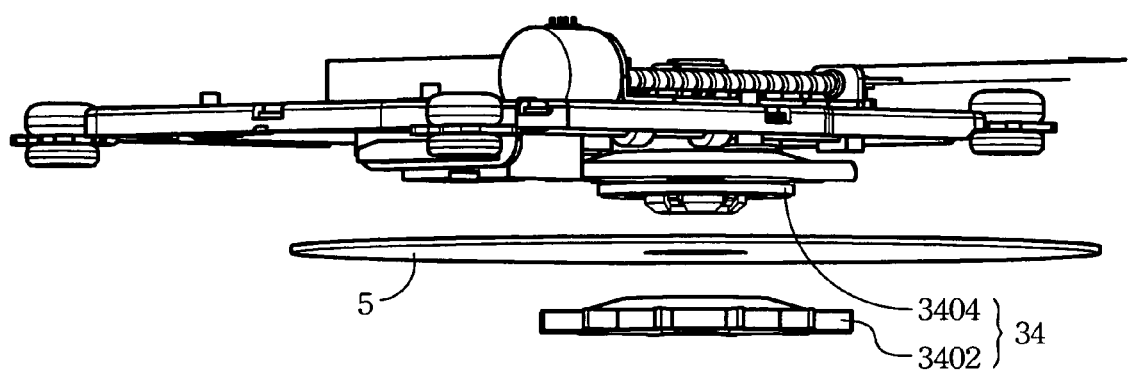
FIG. 2 shows a schematic view depicting the traditional grapple.

Referring to FIG. 2, the grapple 34 is used to hold the optical storage medium. The grapple 34 includes a clamper 3402 and a spindle motor 3404. The optical storage medium is sandwiched between the clamper 3402 and the spindle motor 3404. Then, the spindle motor 3404 rotates the clamper 3402 and the optical storage medium.

Figure 4:
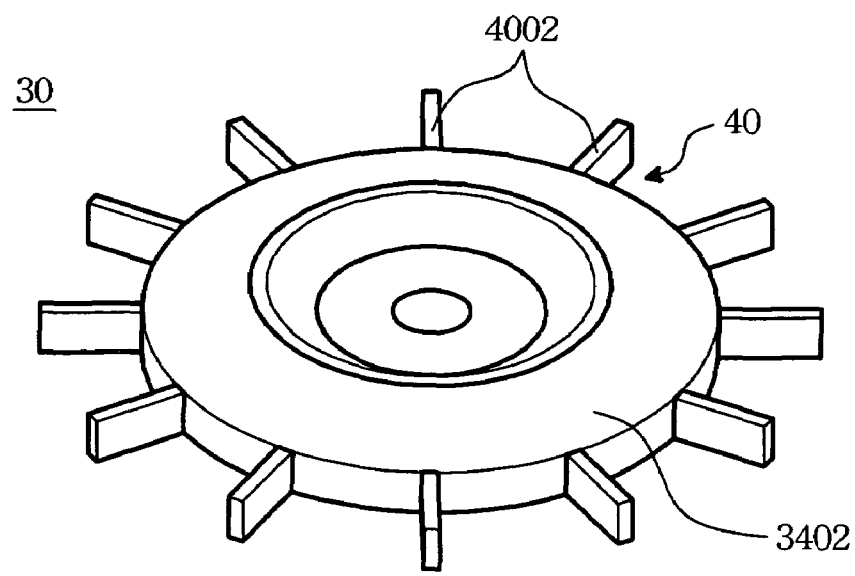
FIG. 4 shows a schematic view depicting the clamper and blower of the present invention.

Please refer to FIG. 3 and FIG. 4 which shows a schematic view depicting the clamper 3402 and blower 40 of the present invention. The blower 40 is arranged on the hub of the clamper 3402. Each of the blades 4002 of the blower 40 extends from the center of the clamper 3402 radially. Through the rotary of the clamper 3402, the blower 40 is rotated and airflow is created. In an preferred embodiment, if the extending directions of all the blades 4002 pass through the center of the clamper 3402, there is better air disturbance around the peripheral of the hub of the clamper 3402.

Figure 5:
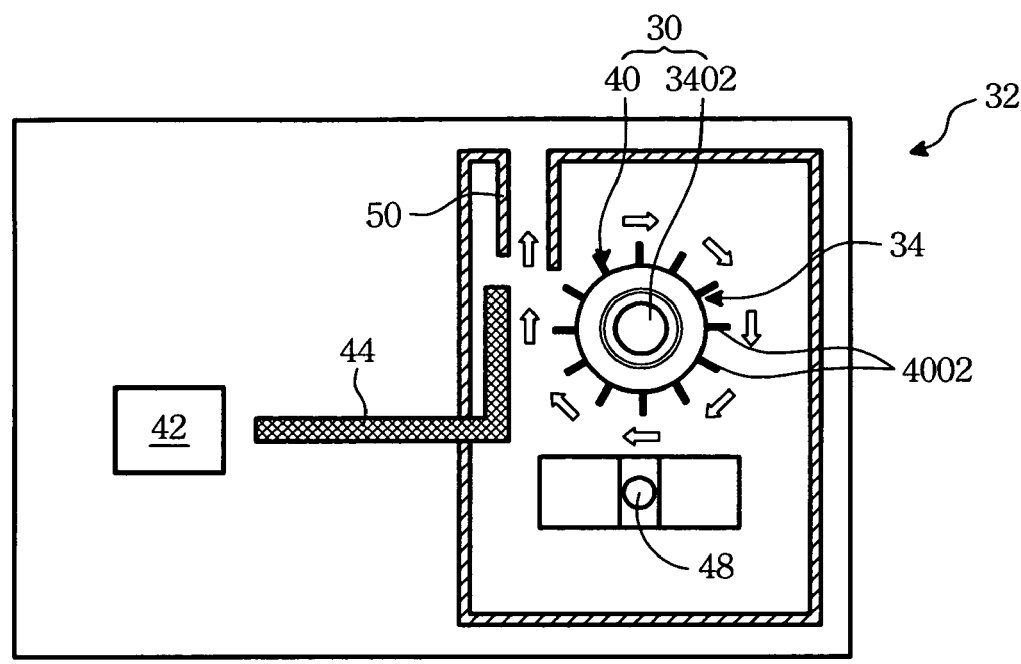
FIG. 5 shows a schematic view depicting the fist embodiment of the present invention in which the chip is cooled down.

Through the cooling device 30 shown in FIG. 4, the implement of the present invention shown in FIG. 5 is achieved. FIG. 5 shows a schematic view depicting the fist embodiment of the present invention in which the chip 42 of the optical recording and/or reproducing apparatus 32 is cooled down. As shown in FIG. 5, in the optical recording and/or reproducing apparatus 32, besides the chip 42 and the clamper 3402 of the grapple 34, there is also a thermal conductive element 44, such as a metallic thermal conductive object or a thermal pipe. Because in the optical recording and/or reproducing apparatus 32, the chip 42 is far away from the clamper 3402, it is preferred that one end of the thermal conductive element 44 is adjacent to the chip 42 and the other end of the thermal conductive element 44 is adjacent to the blower 40. Through the thermal conductive element 44, the heat generated by the chip 42 is dissipated. On the other hand, through blowing of the airflow driven by the blade 4002 of the blower 40 over the other end of the thermal conductive element 44, the thermal conductive element 44 is cooled down and the temperature of the chip is also reduced indirectly.

Figure 6:
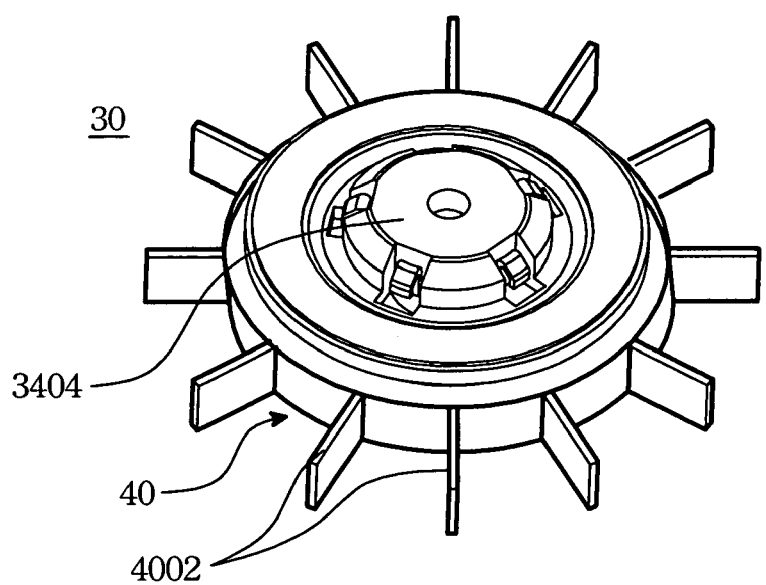
FIG. 6 show a schematic view depicting the spindle motor and the blower of the preset invention.

FIG. 6 show a schematic view depicting the spindle motor 3404 and the blower 40 of the preset invention. This embodiment has the clamper 3402 the same with the above embodiment. However, in contrast with the above embodiment, the blower 40 is arranged on the spindle motor 3404 of the grapple 34. The blower 40 is arranged on a hub of the spindle motor 3404. Each of the blades 4002 of the blower 40 extends from the center of the spindle motor 3404 radially. Through the rotary of the spindle motor 3404, the blower 40 is rotated and airflow is created. Similarly, if the extending directions of all the blades 4002 pass through the center of the spindle motor 3404, better air disturbance is available.

Figure 7:
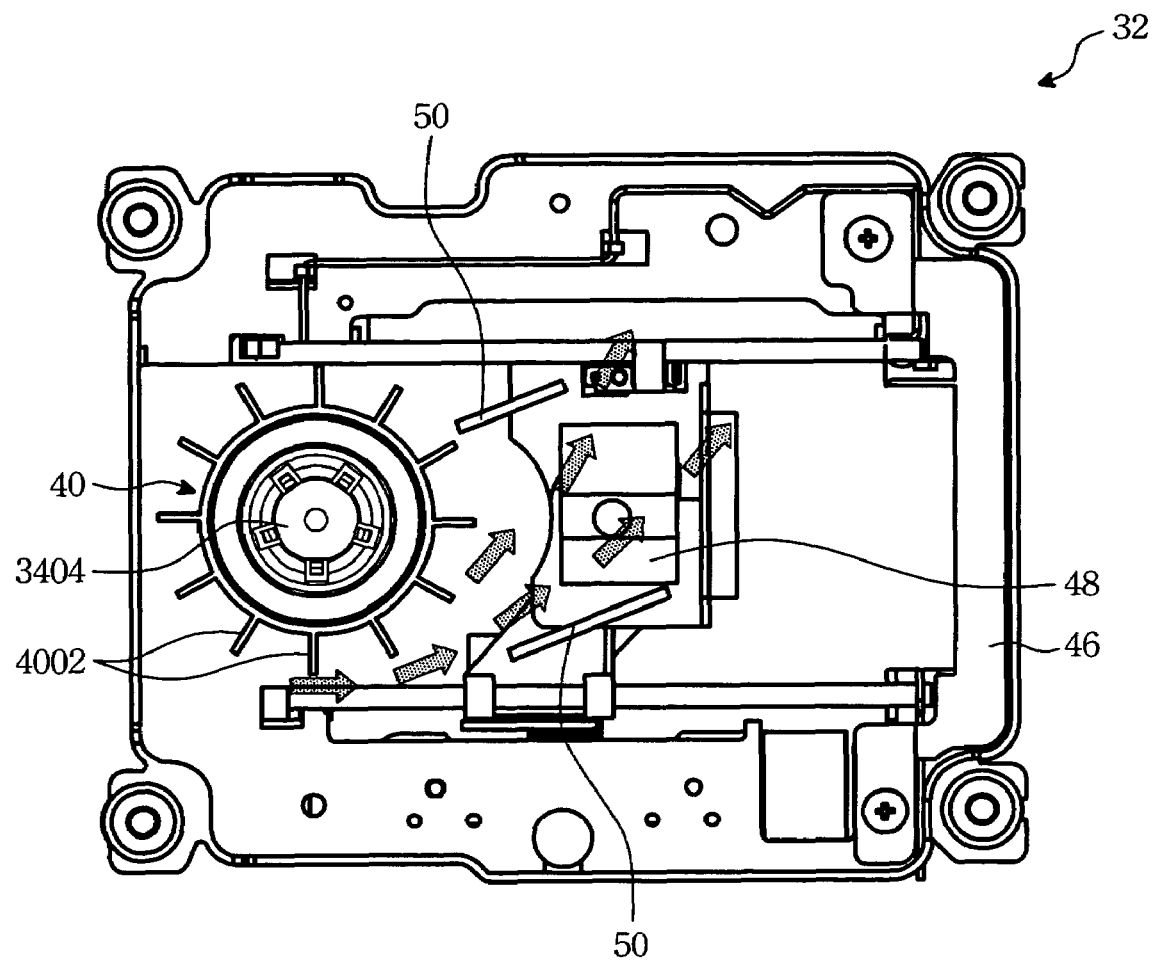
FIG. 7 shows a schematic view depicting the second embodiment of the present invention in which the pickup head is cooled down.

Through the cooling device 30 shown in FIG. 6, the implement of the present invention shown in FIG. 7 is achieved. FIG. 7 shows a schematic view depicting the second embodiment of the present invention in which the pickup head 48 of the optical recording and/or reproducing apparatus 32 is cooled down. Because in the optical recording and/or reproducing apparatus 32, the grapple 34 and the pickup head 48 are located on the same loader 46 shown in FIG. 3, and the spindle motor 3404 and the pickup head 48 are almost on the same level, it is preferred to arrange the blower 40 on the spindle motor 3404, thereby blowing the pickup head 48 directly using airflow and reducing the temperature.

The cooling device 30 of the present invention further includes a baffle 50 as shown in FIG. 5 or FIG. 7. The baffle 50 is fixed in the optical recording and/or reproducing apparatus 32 and guides the above-mentioned airflow. As shown in FIG. 5, the baffle 50 deflects and guides the hot air around the other end of the thermal conductive element 44 driven by the blades 4002 to flow out of the optical recording and/or reproducing apparatus 32. As shown in FIG. 7, the baffle 50 deflects and guides a large amount of cool air flowing toward the pickup head 48, thereby cooling down the pickup head 48.

In brief, the present cooling device 30 makes use of the grapple 34 and the blower 40 thereon to create airflow when the grapple 34 is rotated. In this way, the heat generated by the pickup head 48 and the chip 42 can be significantly reduced. This prevent of the optical recording and/or reproducing apparatus 32 using the cooling device 30 from overheat. Further, the possibility that reading error or failure of other elements occurs is reduced.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

I claim:

1. A cooling device used in an optical recording and/or reproducing apparatus which reads the data stored on an optical storage medium, comprising:
   a grapple, used to hold and rotate the optical storage medium;
   at least one baffle, fixed in the optical recording and/or reproducing apparatus; and
   a blower, arranged on the grapple and having a plurality of blades extending from a center of the grapple radially;
   wherein the grapple rotates the blower, thereby the blades creating airflow and the baffle deflecting and guiding the airflow.

2. A cooling device used in an optical recording and/or reproducing apparatus which reads the data stored on an optical storage medium, comprising:
   a grapple, used to hold and rotate the optical storage medium;
   a blower, arranged on the grapple and having a plurality of blades extending from a center of the grapple radially; and
   a thermal conductive element having one end adjacent to a heat source of the optical recording and/or reproducing apparatus and the other end adjacent to the blower;
   wherein the grapple rotates the blower, thereby the blades creating airflow.

3. The cooling device according to claim 2, wherein the thermal conductive element is chosen from the group consisting of a metallic thermal conductive object and a thermal pipe.

4. The cooling device according to claim 2, wherein the heat source is chosen from the group consisting of a chip and a pickup head.

5. The cooling device according to claim 1, wherein the grapple further comprises:
   a clamper; and
   a spindle motor, holding the optical storage medium with the clamper, rotating the clamper and the optical storage medium.

6. The cooling device according to claim 5, wherein the blower is arranged on the clamper of the grapple, thereby the clamper rotating the blower and the blades creating airflow.

7. The cooling device according to claim 5, wherein the blower is arranged on the spindle motor of the grapple, thereby the spindle motor rotating the blower and the blades creating airflow.

8. An optical recording and/or reproducing apparatus recording and/or reproducing the data stored on an optical storage medium, comprising:
   a grapple, used to hold and rotate the optical storage medium;
   at least one baffle, fixed in the optical recording and/or reproducing apparatus; and
   a blower, arranged on the grapple and having a plurality of blades extending from a center of the grapple radially;
   wherein the grapple rotates the blower, thereby the blades creating airflow and the baffle deflecting and guiding the airflow.

9. An optical recording and/or reproducing apparatus recording and/or reproducing the data stored on an optical storage medium, comprising:
   a grapple, used to hold and rotate the optical storage medium;
   a thermal conductive element having one end adjacent to a heat source of the optical recording and/or reproducing apparatus and the other end adjacent to the blower; and a blower, arranged on the grapple and having a plurality of blades extending from a center of the grapple radially;

wherein the grapple rotates the blower, thereby the blades creating airflow.

10. The apparatus according to claim 9, wherein the thermal conductive element is chosen from the group consisting of a metallic thermal conductive object and a thermal pipe.

11. The apparatus device according to claim 9, wherein the heat source is chosen from the group consisting of a chip and a pickup head.

12. The apparatus according to claim 8, wherein the grapple further comprises:

a clamper; and a spindle motor, holding the optical storage medium with the clamper, rotating the clamper and the optical storage medium.

13. The apparatus according to claim 12, wherein the blower is arranged on the clamper of the grapple, thereby the clamper rotating the blower and the blades creating airflow.

14. The apparatus according to claim 12, wherein the blower is arranged on the spindle motor of the grapple, thereby the spindle motor rotating the blower and the blades creating airflow.

* * * * *